United States Patent [19]

Minami

[11] Patent Number: 4,951,043

[45] Date of Patent: Aug. 21, 1990

[54] PAGER RECEIVER HELPFUL FOR EFFECTIVE USE OF CALL NUMBERS

[75] Inventor: Yoichiro Minami, Tokyo, Japan

[73] Assignee: NEC Corporation, Japan

[21] Appl. No.: 20,778

[22] Filed: Mar. 2, 1987

[30] Foreign Application Priority Data

Mar. 4, 1986 [JP] Japan .................................. 61-45372

[51] Int. Cl.[5] .............................................. G08B 5/22
[52] U.S. Cl. ...................... 340/825.440; 340/825.480
[58] Field of Search ...................... 340/825.44, 825.48, 340/311.1; 379/56, 57, 354, 360, 361; 455/31, 38

[56] References Cited

U.S. PATENT DOCUMENTS

| | | | |
|---|---|---|---|
| 4,072,824 | 2/1978 | Phillips | 379/57 |
| 4,313,035 | 1/1982 | Jordan et al. | 379/61 |
| 4,403,212 | 9/1983 | Masaki | 340/311.1 |
| 4,408,099 | 10/1983 | Ishii | 340/825.48 |
| 4,412,217 | 10/1983 | Willard et al. | 340/825.44 |
| 4,490,579 | 12/1984 | Godoshian | 379/57 |
| 4,613,859 | 9/1986 | Mori | 340/825.44 |
| 4,618,860 | 10/1986 | Mori | 340/825.48 |
| 4,682,148 | 7/1987 | Ichikawa et al. | 340/311.1 |

*Primary Examiner*—Donald J. Yusko
*Assistant Examiner*—Edwin C. Holloway, III
*Attorney, Agent, or Firm*—Laff, Whitesel, Conte & Saret

[57] ABSTRACT

In a pager receiver operable in response to an incoming signal including a specific call number signal preassigned to the pager receiver, a directory number signal of a calling subscriber follows the specific call number signal. The directory number signal is detected by a directory number detector (17) after detection of the specific call number signal and is converted into a corresponding dial tone signal by a dial tone generator (21). The dial tone signal is automatically sent through a telephone set to the calling subscriber in response to closure of a switch (19). Thus, the pager receiver may be of a tone-only type and can call back unspecific persons even when the directory number signal is not displayed on a display unit. A particular symbol may be included in the directory number signal so as to distinguish the directory number signal from a usual message signal.

5 Claims, 5 Drawing Sheets 0 3 - 9 3 2 ✻ 1 1 1 1

0 4 2 6 - 9 1 ✻ 4 3 2 1

0 4 4 - 4 1 1 ✻ 1 2 3 4

0 2 5 7 4 - 7 ✻ 3 6 9 1

PAGER RECEIVER HELPFUL FOR EFFECTIVE USE OF CALL NUMBERS

BACKGROUND OF THE INVENTION

This invention relates to a pager receiver operable in response to a specific call number signal preassigned to the pager receiver.

A pager receiver is classified into two types one of which has no display and the other of which provides displays. The former receiver generates only an audible tone on reception of the specific call number signal and will be called a receiver of a tone-only type or a tone-only type receiver. On the other hand, the latter receiver can display a message in addition to generation of an audible tone and will hereinafter be called a receiver of a display type or a display type receiver. Although this description will mainly be directed in the preamble of the instant specification to the receiver of the tone-only type, this invention is equally well applicable to the receiver of the display type.

In the tone-only type receiver, it is impossible to visually display a directory number of a calling subscriber when a called subscriber or a possessor is called by generation of the audible tone. Under the circumstances, a prescribed telephone number is previously determined between the calling subscriber and the possessor. The possessor is communicable with the calling subscriber by dialing the prescribed telephone number.

In order to dispense with dialing the prescribed telephone number, an automatic dialing device is known which may be named an autodialer and which comprises a memory for memorizing a preselected telephone number and a converter for converting the preselected telephone number into a corresponding dial tone. With this structure, the dial tone can automatically be sent from the automatic dialing device through a telephone set and a telephone line to a calling subscriber when the automatic dialing device is energized by manipulation of the possessor.

Even when the automatic dialing device is included in the tone-only type receiver, the calling subscriber must stay near a telephone identified by the prescribed telephone number until the calling subscriber is called back from the possessor. Therefore, the tone-only type receiver is inconvenient in that a restriction is imposed on a geographic position or location of the calling subscriber.

Intervention of a third party or person might be considered between the possessor and the calling subscriber so as to remove the above-mentioned restriction of the geographic location of the calling subscriber. In this event, the possessor can be connected to the calling subscriber through the third person. If the calling subscriber informs the third party of his or her location, the calling subscriber can always speak with the possessor.

However, such intervention of the third party requires extra labor and is troublesome.

Further consideration is made about assigning to a single tone-only type receiver a plurality of different call numbers which may be given to individual calling subscribers. In this case, reception of the different call number signals is distinguished from one another by individual pitch tones, respectively. Therefore, the possessor can recognize the individual calling subscribers by audibly discriminating the respective calling subscribers. In fact, it is technically confirmed that the number of the call numbers assigned to the single pager receiver is increased to sixteen at maximum. This means that such a tone-only type receiver can access sixteen calling subscribers at maximum because the call numbers have to be made to correspond to the respective calling subscribers.

At any rate, an assignment of the plurality of call numbers to the single tone-only type receiver restricts the number of calling subscribers communicable with the pager receiver and becomes an unfavorable bar against effective use of the call numbers because the plurality of call numbers are exclusively used by the single tone-only type receiver.

Moreover, a subscriber for the above-mentioned tone-only type receiver should pay fees for the plurality of call numbers and must owe an extra economical duty.

SUMMARY OF THE INVENTION

It is an object of this invention to provide a pager receiver which can be accessed by unspecific persons without assigning a plurality of call numbers to the pager receiver.

It is another object of this invention to provide a pager receiver of the type described, which is contributive to effective use of call numbers.

It is a further object of this invention to provide a pager receiver which is capable of lightening an economic burden of a subscriber.

It is a still further object of this invention to provide a pager receiver of the type described, which can automatically access each of the unspecific persons.

It is a yet another object of this invention to provide a pager receiver of the type described, which is effectively operable as a tone-only type receiver.

A pager receiver to which this invention is applicable is capable of responding to an incoming signal to produce a receiver output signal when the incoming signal includes a specific call number signal preassigned to the pager receiver. The specific call number signal is followed in the incoming signal by a directory number signal carrying a directory number assigned to a calling subscriber. According to this invention, the pager receiver comprises detecting means responsive to the incoming signal for detecting the specific call number signal and the directory number signal to produce a detection signal and a reproduction of said directory number signal. The detection signal is representative of a detection of the specific call number signal. The pager receiver further comprises storing means coupled to the detecting means for storing the reproduction of the directory number signal to produce a stored directory number signal, converting means coupled to the storing means for converting the stored directory number signal into a dial tone signal corresponding to the stored directory number signal, and signal producing means coupled to the detecting means and the converting means for producing the detection signal and the dial tone signal as a first and a second part of the receiver output signal, respectively.

DESCRIPTION OF THE PREFERRED EMBODIMENTS

To begin with, a radio communication system to which this invention is applicable may be either a first paging system comprising only tone-only type receivers or a second paging system comprising a mix of tone-only type receivers and display type receivers. For brevity of description, description will at first be directed to the first paging system wherein no message signal is included in a radio calling signal transmitted from a base station (not shown). Thereafter, the second paging system will be described wherein a message signal is included in a radio calling signal.

Figure 1:
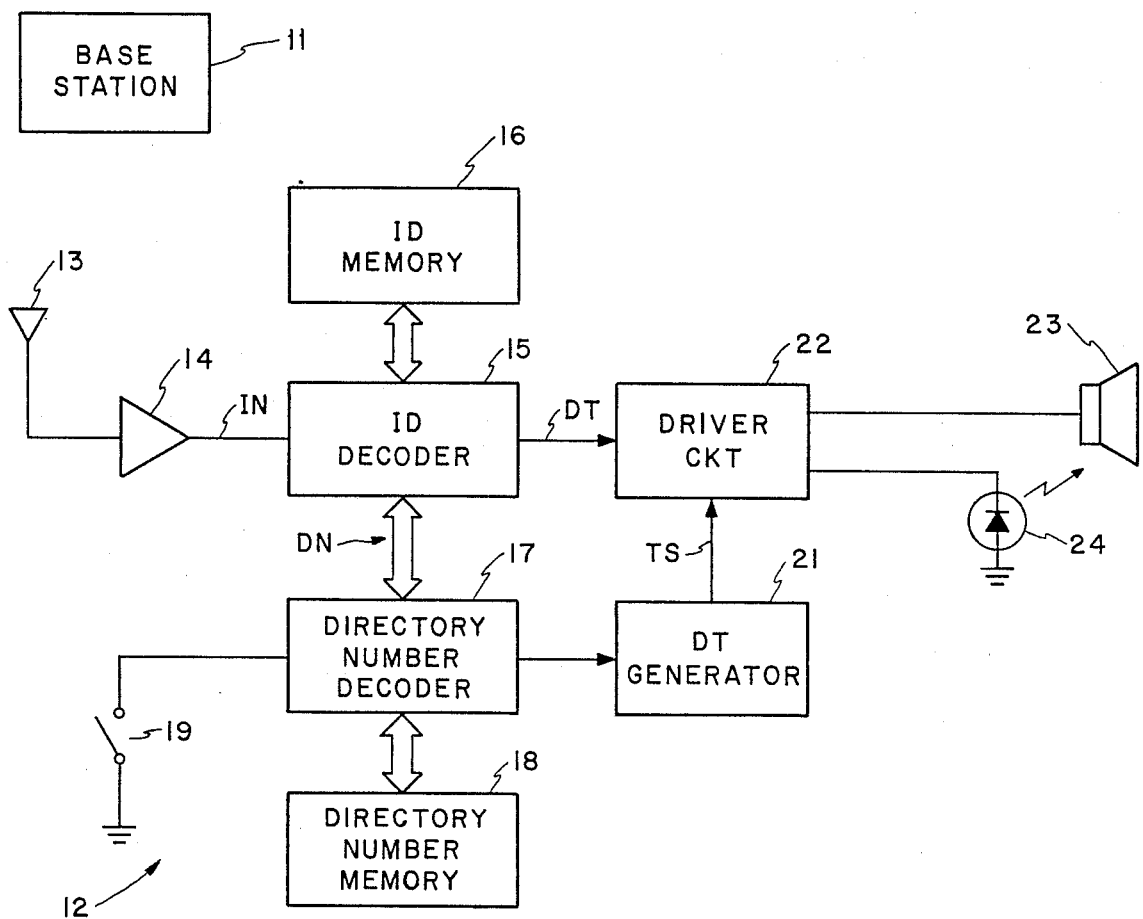
FIG. 1 is a block diagram of a pager receiver of a tone-only type according to a first embodiment of this invention.

Referring to FIG. 1, the first paging system comprises a base station 11 and a plurality of tone-only type receivers one of which is depicted at 12 in FIG. 1 as a representative of the pager receivers of the first paging system. In other words, only the tone-only type receivers are present in a service area of the base station 11 of the first paging system.

A plurality of subscriber substations (not shown) are connected to the base station 11. A call originates from one of the subscriber substations (not shown) for a calling subscriber. In this event, the calling subscriber dials a specific call number which is preassigned to a destined one of the tone-only type receivers and which is sent as a specific call number signal to the base station 11 through a telephone line. It is assumed without loss of generality that the call is destined to the illustrated tone-only type receiver and that the specific call number therefore specifies the illustrated tone-only type receiver. After dialing the specific call number, the calling subscriber further dials the directory number which is preasigned thereto and which is transmitted in the form of a directory number signal after the specific call number signal to the base station 11. The directory number may be represented, for example, by ten digits and is assumed to be (0459321111).

A combination of the specific call number signal and the directory number signal is delivered as a radio calling signal from the base station 11 over the service area thereof.

Figure 2:
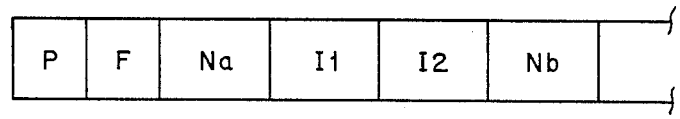
FIG. 2 is a format of a radio calling signal received by the pager receiver illustrated in FIG. 1.

Turning to FIG. 2, the radio calling signal comprises a preamble P of, for example, 225 bits and a frame synchronizing code F of, for example, 32 bits. The frame synchronizing code F is followed by a call number code Na and a directory number code which is divided into a first partial code or word I1 and a second partial code or word I2 succeeding the first partial code I1. The second partial code I2 is followed by another call number code Nb and another directory number code. Description will be restricted to the call number code Na and the first and the second partial codes I1 and I2 with the remaining codes omitted because the remaining codes are similar to the call number code Na and the first and the second partial codes I1 and I2.

Temporarily referring to FIG. 3 together with FIG. 2, the call number code Na comprises an identification signal A of a single bit located at a leading part of the format for the call number code Na, the specific call number signal (depicted at SN) of twenty bits, a check bit signal CH of ten bits, and an even parity EP of a single bit. Thus, the call number code Na consists of thirty-two bits. The illustrated specific code number signal SN of twenty bits is represented by the use of the known BCH code (31, 21), namely, Bose-Chaudhuri-Hocquenghem code (31, 21). In this connection, the check bit signal CH of ten bits is arranged after the specific code number signal SN. When a call number signal (SN) follows the leading part, the identification signal A is given a logic "0" level.

Figure 3A:
FIGS. 3(a) to 3(c) are formats for use in describing portions of the radio calling signal in detail.
Figure 3B:
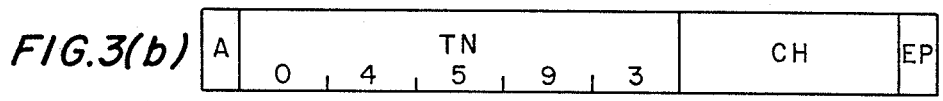

In FIGS. 2 and 3(b), the first partial code I1 of the directory number code has a format similar to that of the call number code Na (FIG. 3(a)) except that a preceding half of the directory number signal (depicted at TN) is arranged instead of the specific code number signal SN. The preceding half TN of the directory number signal is represented by the BCH code (31, 21). In the example being illustrated, the preceding half TN of the directory number signal carries five upper digits of (04593), as shown in FIG. 3(b).

Figure 3C:
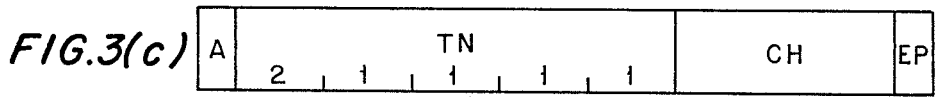

In FIG. 3(c), the second partial code I2 is similar to the first partial code I1 except that a following half TN of the directory number is arranged after the identification signal A. In the illustrated example, five lower digits of (21111) are carried as the following half of the directory number signal. Thus, the illustrated directory number signal TN is transmitted by two words.

At any rate, a logic "1" level is given as the identification signal in FIGS. 3(b) and 3(c) when the directory number signal (TN) follows the identification signal. In FIGS. 3(b) and 3(c), each digit of the directory number is represented by four bits. Accordingly, the whole of the directory number of ten digits can be represented by forty bits.

Referring back to FIG. 1, the radio calling signal is received through an antenna 13 and a radio reception section 14 (specified by an amplifier) to an identification (ID) decoder 15 as an incoming signal IN. Inasmuch as the incoming signal IN is identical with the radio calling signal shown in FIGS. 2 and 3, no distinction will be made between the incoming signal IN and the radio calling signal. The identification decoder 15 is coupled to an identification memory, namely, an ID memory 16 which stores a preassigned number signal representative of a preassigned number of the tone-only type receiver 12 in question. The identification decoder 15 compares the specific call number signal included in the incoming signal IN with the preassigned number signal to produce a detection signal DT which is representative of a detection of the specific call number signal, on coincidence between the specific call number signal and the preassigned number signal. On detection of the specific call number signal, the directory number signal (depicted at DN) included in the incoming signal IN is sent through the identification decoder 15 to a directory number decoder 17 coupled to a directory number memory 18. The detection signal DT may be a call tone signal.

The directory number decoder 17 decodes the directory number signal DN into a decoded signal which is representative of the directory number of the calling subscriber and which will therefore be named a calling subscriber number signal. The calling subscriber number signal is stored in the directory number memory 18. Thus, a combination of the identification decoder 15, the identification memory 16, and the directory number decoder 17 serves to detect the specific call number signal and the directory number signal and may collectively be referred to as a detection circuit for detection of both of them.

A switch 19 is coupled to the directory number decoder 17 and is manually operable by a possessor or user. When the switch 19 is closed by the possessor, the directory number decoder 17 is energized to access the directory number memory 18. As a result, the calling subscriber number signal is read out of the directory number memory 18 as a stored directory number signal to be delivered to a dial tone (DT) generator 21.

The dial tone generator 21 may be a dual tone multifrequency generator which is known in the art and which generates a pair of audio frequency signals selected from a low frequency group and a high frequency group. The audio frequency signal pair is in one-to-one correspondence to a selected one of numbers from "0" to "9", and symbols "*" and "#". At any rate, each digit of the stored directory number signal is successively converted by the dial tone generator 21 into the corresponding audio frequency signal pair digit by digit and is sent to a driver circuit 22 as a dial tone signal TS. Thus, the dial tone signal TS can be made to correspond to the stored directory number signal.

The driver circuit 22 is supplied with the detection signal DT from the identification decoder 15 in addition to the dial tone signal TS. The driver circuit 22 is coupled to both a loudspeaker 23 and a visual indicator 24, such as a light emitting diode (LED) and acts to drive the loudspeaker 23 and the indicator 24.

Responsive to the detection signal DT, the driver circuit 22 drives the loudspeaker 23 and the visual indicator 24. As a result, the loudspeaker 23 audibly generates a call tone as a first part of a receiver output signal to audibly inform the possessor of reception of the specific call number signal. Simultaneously, the visual indicator 24 is also lit to visually inform the possessor of the reception.

The dial tone signal TS is delivered from the dial tone generator 21 through the driver circuit 21 to the loudspeaker 23 when the switch 19 is closed by the possessor. When the loudspeaker 23 is coupled to a telephone set or transmitter by the possessor, such a dial tone signal TS can be sent as a second part of the receiver output signal through a telephone line (not shown) to an exchange (not shown also). Inasmuch as the dial tone signal TS is representative of the directory number of the calling subscriber, as mentioned before, the telephone set can automatically be connected to the subscriber substation and the possessor is communicable with the calling subscriber.

In the example being illustrated, the driver circuit 22, the loudspeaker 23, and the visual indicator 24 are used in common to both the detection signal DT and the dial tone signal TS. The driver circuit 22 is intermediate between the identification decoder 15 and the dial tone generator 21 and couples the identification decoder 15 to the dial tone generator 21. Therefore, the driver circuit 22 may be called a coupling circuit.

Figure 4:
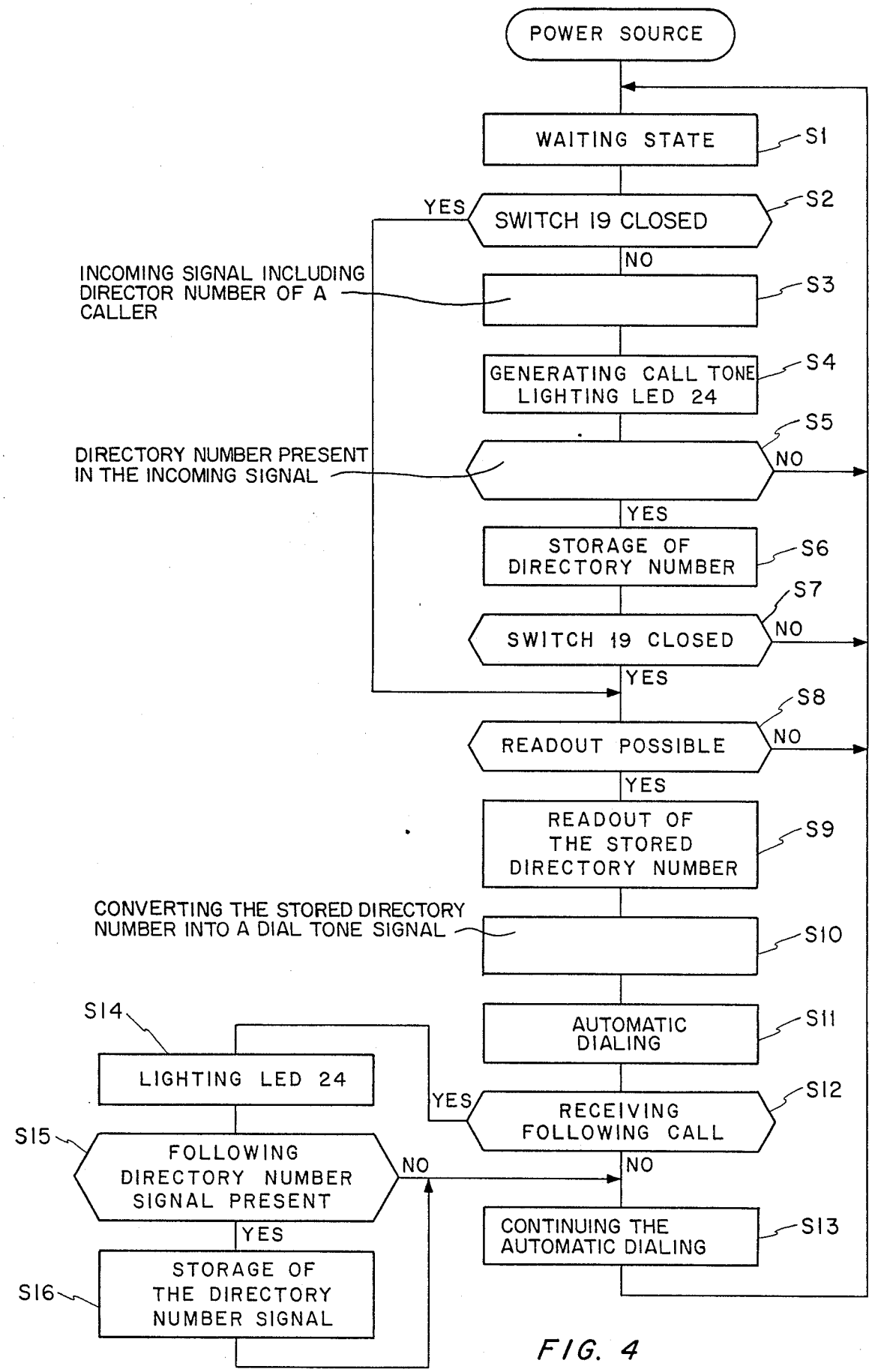
FIG. 4 is a flow chart for use in describing operation of the pager receiver illustrated in FIG. 1.

Referring to FIG. 4 together with FIG. 1, description will be made about operation of a tone-only type receiver 12 as illustrated in FIG. 1. At first, when a power source is turned on, the tone-only type receiver 12 is put into a waiting state of waiting for a call to receive the radio calling signal or the incoming signal IN, as shown at a first step S1. The switch 19 is monitored by the directory number decoder 17 at a second step S2. If the switch 19 is opened, the second step S2 is followed by a third step S3 at which the tone-only type receiver 12 receives the call which may be referred to as a preceding call.

When the specific call number signal is detected by the identification decoder 15, the third step S3 is succeeded by a fourth step S4 at which the loudspeaker 23 and the visual indicator 24 are driven by the driver circuit 22 in a known manner. Consequently, the loudspeaker 23 generates the call tone and the visual indicator 24 is lit, as shown at the fourth step S4.

Subsequently, the directory number decoder 17 detects at a fifth step S5 whether or not the directory number signal is included in the incoming signal IN. When the directory number signal is present in the incoming signal IN, the fifth step S5 is followed by a sixth step S6 at which the directory number signal is stored in the directory number memory 18. Otherwise, operation is returned back to the first step S1.

After storage of the directory number signal, the sixth step S6 is followed by a seventh step S7 at which the switch 19 is monitored by the directory number decoder 17 like in the second step S2. When the switch 19 is closed and the stored directory number signal is present in the directory number memory 18, the directory number decoder 17 judges at an eighth step S8 whether or not the stored directory number signal can be read out of the directory number memory 18. If it is possible to read the stored directory number signal out of the directory number memory 18, the eighth step S8 proceeds to a ninth step S9. Otherwise, operation is turned back to the first step S1.

At the ninth step S9, the stored directory number signal is read out of the directory number memory 18 and is sent to the dial tone generator 21. The stored directory number signal is converted into the corresponding dial tone signal by the dial tone generator 21, as shown at a tenth step S10.

The dial tone signal is sent through the driver circuit 22 to the loudspeaker 23 to be converted into a sound pressure corresponding to the dial tone signal. The resultant sound pressure is produced as the dial tone from the loudspeaker and is sent from a telephone set to the calling subscriber, as shown at an eleventh step S11. This means that automatic dialing operation is carried out without any manual dialing of the possessor.

At a twelfth step S12, the identification decoder 15 judges whether or not a following call is received which includes the specific call number signal. On no reception of such a following call, the twelfth step S12 is succeeded by a thirteenth step S13 at which transmission of the dial tone is continued in connection with the preceding call. Thereafter, the operation is returned from the thirteenth step S13 to the first step S1.

If the following call is received at the twelfth step S12, transmission of the dial tone signal becomes impossible. Under the circumstances, a fourteenth step S14 is carried out after the twelfth step S12 so as to indicate reception of the following call by the indicator 24. In the illustrated example, the light emitting diode 14 is lit by the driving circuit 22.

At a fifteenth step S15, a following directory number signal of the following call is monitored by the directory number decoder 17. The following directory number signal is stored in the directory number memory 18 in the above-mentioned manner, as shown at a sixteenth step S16. Otherwise, the fifteenth step S15 is succeeded by the thirteenth step S13 in order to continue the dial tone signal related to the preceding call.

At any rate, such a directory number decoder 17 may be implemented by a simple logic circuit.

Figure 5:
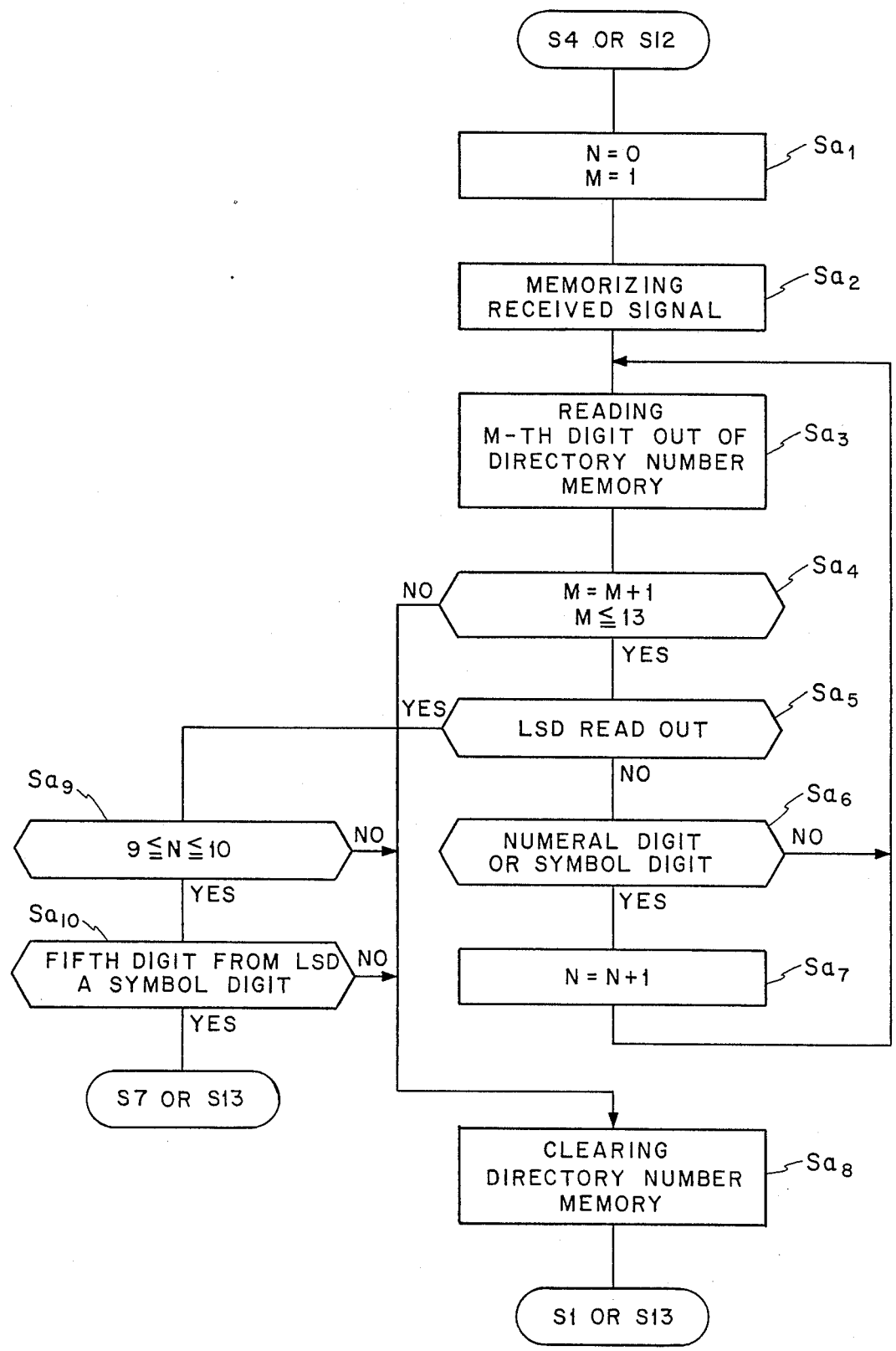
FIG. 5 is a flow chart for use in describing a pager receiver of a tone-only type according to a second embodiment of this invention.

Referring to FIG. 5, a tone-only type receiver according to a second embodiment of this invention is for use in the second paging system which comprises coexistence of tone-only type receivers and display type receivers.

In this event, the base station 11 illustrated in FIG. 1 can produce a radio calling signal which includes a message signal representative of a message in addition to a call number signal transmitted in the form of a call number code, such as Na illustrated in FIGS. 2 and 3(a). If a directory number signal preassigned to a calling subscriber is transmitted from the base station 11 in a manner similar to that illustrated in FIGS. 2 and 3, such a directory number signal can not be distinguished from the message signal. This means that the directory number signal can not be received by the tone-only type receivers and is visually displayed as a message signal in the display type receivers.

Figures 6, 7:
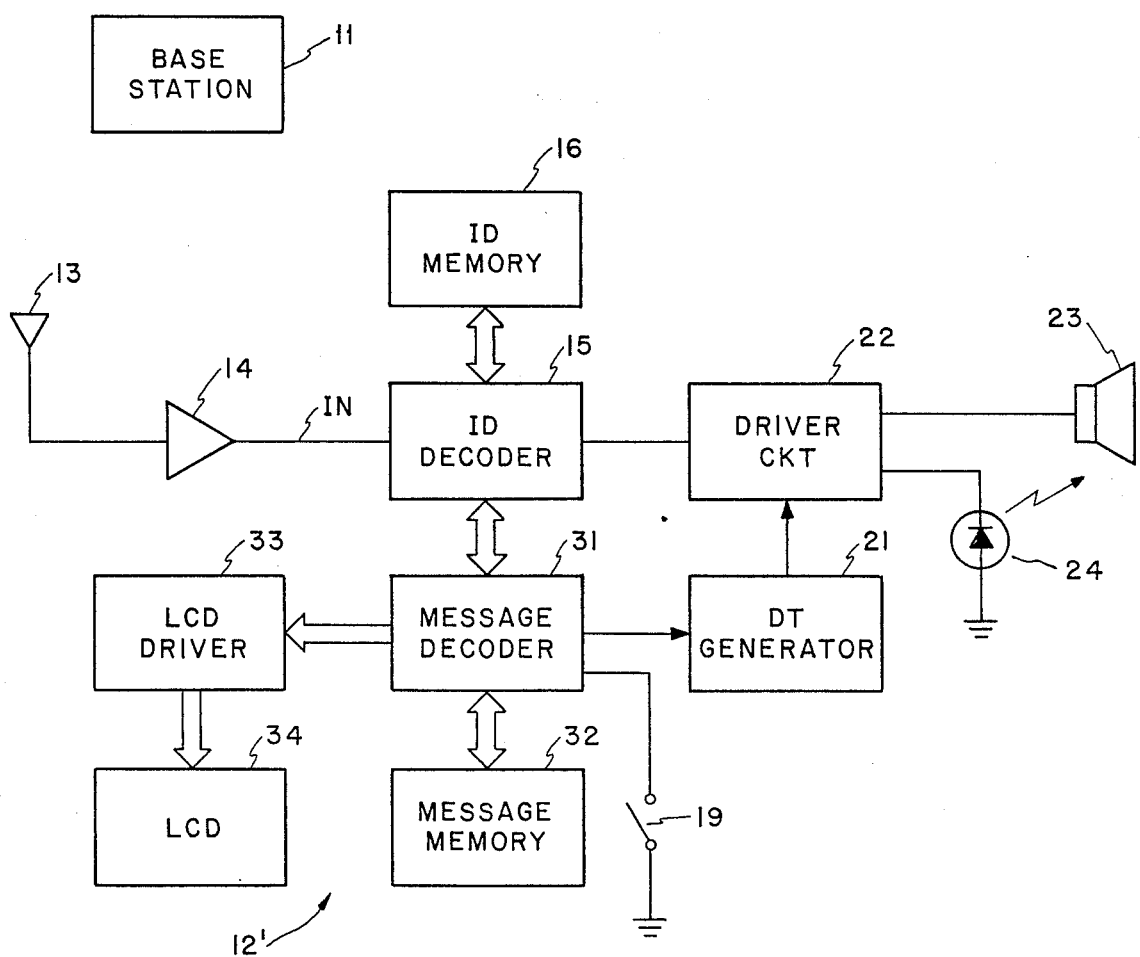
FIG. 6 is examples of directory numbers which can be received by the pager receiver described with reference to FIG. 5.
FIG. 7 is a block diagram of a pager receiver according to a third embodiment of this invention.

Temporarily referring to FIG. 6, manual operation of a calling subscriber is somewhat modified on transmission of a directory number which is preassigned to the calling subscriber and which is transmitted after transmission of a destined call number, in order to distinguish the directory number from a message and to enable reception of tone-only receivers.

In general, a directory number in Japan is divisible into an upper part including a most significant digit, a middle part, and a lower part including a least significant digit, as exemplified in FIG. 6. The upper part consists of two, three, four, or five digits of decimal numbers while the middle part consists of one, two or three digits. The upper and the middle parts have variable digit numbers. On the other hand, the lower part consists of four digits and has an invariable digit number. Taking this into consideration, a particular sign or symbol, such as an asterisk or the like, is disposed to identify the directory number signal before the lower part by manual operation of each calling subscriber, as illustrated in FIG. 6. Thus, the particular symbol is located at a fifth digit from the least significant digit of each directory number and may be a hyphen when a call originates from a personal computer. A directory number including the particular symbol may be called a modified directory number which is transmitted in the form of a modified directory number signal from a base station.

Such disposition of the particular symbol before the lower part serves to make each tone-only type receiver distinguish each directory number from a message. Stated otherwise, such a modified directory number is effective to make each tone-only type receiver receive no message signal.

An additional particular symbol may be disposed between the upper and the middle parts of each directory number, although such an additional particular symbol may be neglected on distinction between the directory number and the message. At any rate, the modified directory number has the digit number which is not greater than thirteen and can be transmitted by the use of third partial codes or word, as illustrated at I1, I2, in FIG. 2.

For the purpose of distinction between a directory number and a message, the fifth and the sixth steps S5 and S6 and the fourteenth through the sixteenth steps S14 to S16 shown in FIG. 4 are replaced by procedure illustrated in FIG. 5. In other words, the procedure of FIG. 5 may be placed between the fourth and the seventh steps S4 and S7 (FIG. 4) and between the twelfth and the thirteenth steps S12 and S13.

The tone-only type receiver according to the second embodiment may be similar in structure to that illustrated in FIG. 1. Therefore, description will be made with reference to FIGS. 1 and 4 in addition to FIG. 5.

As suggested before, the modified directory number is specified by ten numeral digits and a single or a plurality of particular symbol digits and has total digits which are not greater in number than thirteen. It is assumed that each digit of the modified directory number can be represented by four bits.

In the directory number decoder 17, the number of digits of the modified directory number is successively counted. In this event, the number N of numeral digits is counted independently of a whole number M of digits including the particular symbol digits. The numbers N and M may be called first and second numbers, respectively.

In FIG. 5, the fourth step S4 or the twelfth step S12 illustrated in FIG. 4 is followed by a first additional step $Sa_1$ of initializing the first and the second numbers N and M into "0" and "1", respectively. Under the circumstances, the directory number decoder 17 does not discriminate whether a received signal following the call number signal is a directory number signal or a message signal.

At a second additional step $Sa_2$, the received signal is successively stored in the directory number memory 18 from a first digit of the received signal to a first digit thereof.

The second additional step $Sa_2$ is followed by a third additional step $Sa_3$ at which the M-th digit of the received signal is read out of the directory number memory 17.

At a fourth additional step $Sa_4$, the second number M is counted up by one in the directory number decoder 17. The resultant (M+1) is handled as a renewed second number M and is compared with a maximum digit number of thirteen. If the renewed number M is smaller than or equal to the maximum digit number, the fourth additional step $Sa_4$ is succeeded by a fifth additional step $Sa_5$ at which the directory number decoder 15 judges whether or not the least significant digit is read out of the directory number memory 18.

If the least significant digit is not read out of the directory number memory 18, distinction is made between a numeral digit and a symbol digit at a sixth additional step $Sa_6$ in the directory number decoder 17. Such distinction is possible by judging whether or not the digit in question specifies a number which is smaller than or equal to nine.

When the digit in question specifies the numeral digit, the first number N is counted up by one at a seventh additional step $Sa_7$ in the directory number decoder 18 and therefore renewed into (N+1) which is rendered into the next number N. Thereafter, the seventh additional step $Sa_7$ proceeds to the third additional step $Sa_3$.

On the other hand, if the digit in question is judged as a symbol digit at the sixth additional step $Sa_6$, operation is returned back to the third additional step $Sa_3$ without carrying out the seventh additional step $Sa_7$.

At the fourth additional step $Sa_4$, let the second number M become greater than thirteen. In this case, the fourth additional step $Sa_4$ is succeeded by an eighth additional step $Sa_8$ of clearing the directory number memory 18 and thereafter returned back to the first step S1 or the thirteenth step S13 (FIG. 4).

If all of the digits of the received signal are read out of the directory number memory 18 at the fifth additional step $Sa_5$, a ninth additional step $Sa_9$ is carried out by the directory number decoder 17 to judge whether or not the first number N is between 9 and 10, both inclusive.

If the first number N is equal to 9 or 10, the ninth additional step $Sa_9$ proceeds to a tenth additional step $Sa_{10}$ so as to monitor the fifth digit from the least significant digit of the directory number by the directory number decoder 17. When the fifth digit from the least significant digit is a symbol digit, the received signal may be recognized as a directory number. Therefore, the tenth additional step $Sa_{10}$ is followed by the seventh or thirteenth step S7 or S13. Otherwise, the eighth additional step $Sa_8$ follows the tenth additional step $Sa_{10}$.

The above-mentioned directory number decoder 17 can be readily implemented by a microprocessor. More specifically, the identification decoder 17 detects the specific call number signal and may be called a first detection circuit. In addition, the particular symbol is detected by the directory number decoder 17 at the tenth additional step $Sa_{10}$ to identify the directory number signal. Accordingly, the tenth additional step $Sa_{10}$ may be referred to as a second detection part for detecting the particular symbol as an identification signal. Likewise, the seventh through eleventh steps S7 to S11 (FIG. 4) are carried out to produce a reproduction of the directory number signal and may be referred to as a production part for producing the reproduction.

Referring to FIG. 7, a pager receiver 12' according to a third embodiment of this invention can visually display a message transmitted from a base station 11 and may be called a display type receiver which is for use in the second paging system. The pager receiver is similar in structure to that illustrated in FIG. 1 except that a message decoder 31 and a message memory 32 are substituted for the directory number decoder 17 and the directory number memory 18 (FIG. 1), respectively, and that a liquid crystal display (LCD) driver 33 and a liquid crystal display 34 are included in the illustrated pager receiver.

A directory number is sent from the base station 11 as a specific message to indicate a calling subscriber after transmission of a call number. Thus, the directory number should be distinguished from a usual message. The directory number, the message, the calling number are reproduced as a directory number signal, a message signal, and a calling number signal, like in FIG. 3, respectively. Therefore, a possessor or user should judge whether a received signal which follows the calling number signal is a directory number signal or a message signal. Accordingly, the received signal is once displayed on the liquid crystal display 34 for judgement of the possessor.

Figure 8:
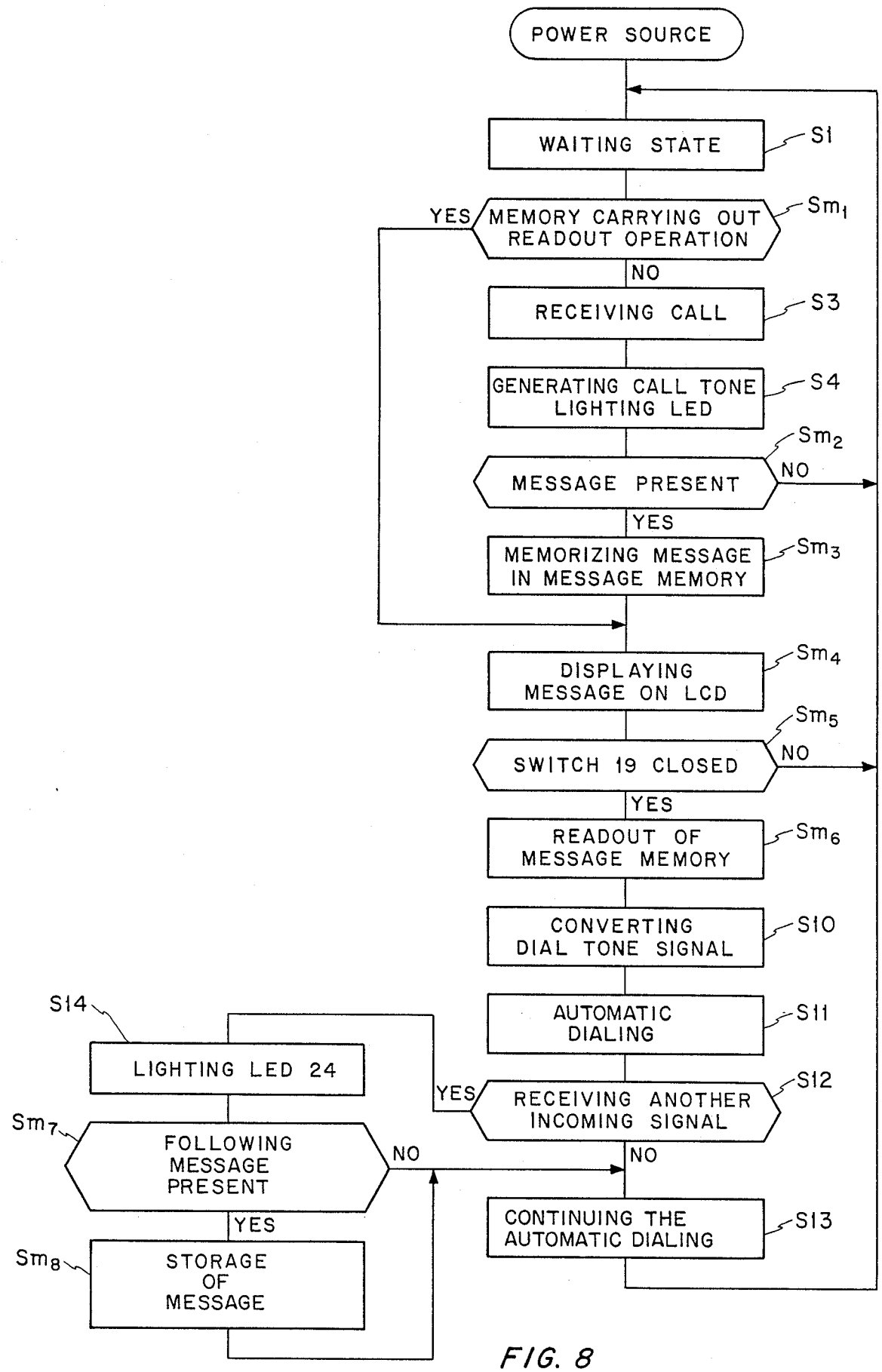
FIG. 8 is a flow chart for use in describing operation of the pager receiver illustrated in FIG. 7.

Referring to FIG. 8 together with FIG. 7, operation is carried out in accordance with a flow chart which is illustrated in FIG. 8. The flow chart of FIG. 8 is similar to that illustrated in FIG. 4 except that modification is made at steps which will be referred to as modified steps depicted at Sm. A first one $Sm_1$ of the modified steps follows the first step S1 of waiting for a call to judge whether or not the message memory 32 is carrying out readout operation. Such judgement is made by the message decoder 31. When readout operation is not carried out by the memory decoder 31, the first modified step $Sm_1$ is followed through the third and the fourth steps S3 and S4 by a second one $Sm_2$ of the modified steps.

At the second modified step $Sm_2$, the message decoder 31 judges whether or not any message follows a specific call number signal in the received call in question. If no message is included in the received call, procedure is returned back to the first step S1. Otherwise, a message is stored into the message memory 32 at a third modified step $Sm_3$ as a stored message.

The message is also displayed on the liquid crystal display 34 through the liquid crystal display driver 33 at a fourth modified step $Sm_4$.

Under the circumstances, the message decoder 31 monitor the switch 19 at a firth modified step $Sm_5$ to detect whether or not the switch 19 is closed. The fifth modified step $Sm_5$ is similar to the seventh step S7 except that the message decoder 31 is used instead of the directory number decoder 17.

On closure of the switch 19, the stored message is read out of the message memory 32 as a readout message under control of the message decoder 31 at a sixth modified step $Sm_6$ to be sent to the dial tone generator 21.

The readout message is converted into a corresponding dial tone by the dial tone generator 21 at the tenth step S10 and processed in a like manner through the eleventh, the twelfth, the thirteenth and the fourteenth steps S11, S12, S13, and S14.

Seventh and eighth modified steps $Sm_7$ and $Sm_8$ are for processing a following message signal like the fifteenth and the sixteenth steps S15 and S16. However, it is to be noted that the following message signal is stored in the message memory 32 under control of the message decoder 31 at the seventh and the eighth modified steps $Sm_7$ and $Sm_8$.

It is readily possible to carry out the above-mentioned operation when a microprocessor is used as the message decoder 31.

While this invention has thus far been described in conjunction with a few embodiments thereof, it will readily be possible for those skilled in he art to put this invention into practice in various other manners. For example, a plurality of call numbers may be assigned to each pager receiver.

What is claim is:

1. In a pager receiver for use in a radio communication system which provides a mix of a message service and a tone service, said pager receiver operating responsive to an incoming signal to produce an audible tone without providing visual displays for said message service when said incoming signal includes a specific call number signal which is preassigned to said pager receiver, said specific call number signal being followed by a directory number signal carrying a directory number assigned to a calling subscriber, said pager receiver comprising:
  means for receiving a directory number signal including an identification symbol within said directory number, said identification symbol distinguished said directory number from another message signal for said message service, said other message signal including no identification symbol which distinguishes it form said directory number;

first detecting means responsive to said incoming signal for detecting said specific call number signal to produce a detection signal which is representative of a detection of said specific call number signal;

second detecting means responsive to said incoming signal for detecting said identification symbol to produce an additional detection signal which is representative of a detection of said identification symbol;

signal producing means coupled to said second detecting means for producing a reproduction of said directory number signal when said additional detection signal is produced by said second detecting means; and means coupled to said first means and said signal producing means for producing said detection signal and said reproduction of the directory number signal as said audible tone.

2. The pager of claim 1 wherein said directory number is a modification of a calling subscriber directory number which is transmitted after a transmission of a destination call number.

3. The pager of claim 2 wherein a particular symbol signal is transmitted in with said directory number in order to provide said modification of said calling subscriber directory number.

4. The pager of claim 3 wherein said particular symbol signal is in the fifth digit position away from the least significant digit in a directory number.

5. The pager of claim 2 and means in said pager for distinguishing message signals by detecting the presence or absence of a modified subscriber number.

* * * * *